(12) United States Patent
Craw et al.

(10) Patent No.: US 10,981,802 B2
(45) Date of Patent: Apr. 20, 2021

(54) WATER TREATMENT SYSTEMS AND METHODS OF TREATING WATER

(71) Applicant: AqueoUS Vets, Danville, CA (US)

(72) Inventors: Robert G. Craw, Danville, CA (US); Christopher J. Perry, Cottonwood, CA (US)

(73) Assignee: AqueoUS Vets, Danville, CA (US)

( * ) Notice: Subject to any disclaimer, the term of this patent is extended or adjusted under 35 U.S.C. 154(b) by 56 days.

(21) Appl. No.: 16/035,076

(22) Filed: Jul. 13, 2018

(65) Prior Publication Data

US 2019/0169044 A1 Jun. 6, 2019

Related U.S. Application Data

(60) Provisional application No. 62/593,353, filed on Dec. 1, 2017.

(51) Int. Cl.
*C02F 1/00* (2006.01)
*C02F 1/28* (2006.01)

(52) U.S. Cl.
CPC .............. *C02F 1/006* (2013.01); *C02F 1/004* (2013.01); *C02F 1/283* (2013.01); *C02F 2209/03* (2013.01); *C02F 2209/40* (2013.01); *C02F 2301/04* (2013.01); *C02F 2303/16* (2013.01)

(58) Field of Classification Search
CPC ...... C02F 1/006; C02F 1/004; C02F 2209/03; C02F 2301/04; C02F 2209/40; C02F 2303/16; C02F 1/283
See application file for complete search history.

(56) References Cited

U.S. PATENT DOCUMENTS

| | | | | |
|---|---|---|---|---|
| 3,847,805 A | * | 11/1974 | Voedisch | B01J 8/025 210/675 |
| 4,515,691 A | * | 5/1985 | Ida | B01D 39/02 210/274 |
| 2015/0343336 A1 | * | 12/2015 | Mackay Pett | B01J 20/08 502/22 |
| 2018/0111863 A1 | * | 4/2018 | Baas | C02F 3/308 |

\* cited by examiner

*Primary Examiner* — Waqaas Ali
(74) *Attorney, Agent, or Firm* — The Webb Law Firm

(57) ABSTRACT

A water treatment system includes: a first vessel having adsorbent materials that form a filtering bed; a second vessel in fluid communication with the first vessel and which includes adsorbent materials that form a filtering bed; an underdrain collection system having ring headers formed below the first and second vessel; a liquid control system in fluid communication with the first vessel, the second vessel, and the underdrain collection system; adsorbent material influent lines; water wash-down lines; raw water lines; and adsorbent material effluent lines, each adsorbent material effluent line having an inlet attached to a bottom of the first or second vessel and an outlet that extends out from the first or second vessel and which is positioned above the ring headers of the underdrain collection system.

14 Claims, 10 Drawing Sheets

WATER TREATMENT SYSTEMS AND METHODS OF TREATING WATER

CROSS REFERENCE TO RELATED APPLICATIONS

This application claims the benefit of U.S. Provisional Patent Application No. 62/593,353, filed Dec. 1, 2017, which is incorporated herein by reference in its entirety.

BACKGROUND OF THE INVENTION

Field of the Invention

The present invention relates to water treatment systems and methods of treating water using the water treatment systems.

Description of Related Art

Water treatment systems generally consist of one or more vessels that contain filter media designed to capture and remove contaminants found in water. Large water treatment filter vessels are typically designed with a limited diameter which requires the overall height to be increased in order to accommodate the necessary filter media (e.g., granular activated carbon, ion-exchange resins, various sands, etc.) and meet the technical requirements of the water treatment system. If design flow requirements and subsequent volume of the filter media cannot be placed into a vessel due to height restrictions, instability, and/or pressure drop increases, the water system may require multiple smaller vessels to meet the requirements. Alternatively, a vault like structure can be used to lower the water system below grade level into an engineered concrete structure, thereby lowering the overall height of the vessel.

While smaller vessels and vault like structures can be used to meet the technical requirements of the water system, these systems have various drawbacks. For instance, smaller vessels typically present area issues (not enough area/room for multiple smaller systems) as well as piping issues due to the number of vessels. Further, vault like structures add significant costs in engineering, permitting, and construction. It is therefore desirable to provide a water treatment system that meets all the technical requirements and which does not require multiple smaller vessels or vault like structures.

SUMMARY OF THE INVENTION

Generally, the present invention is directed to water treatment systems and methods of operating water treatment systems.

In certain non-limiting embodiments, the present invention includes a water treatment system that includes: a first vessel comprising adsorbent materials that form a filtering bed in an interior of the first vessel; a second vessel in fluid communication with the first vessel and which comprises adsorbent materials that form a filtering bed in an interior of the second vessel; an underdrain collection system comprising ring headers formed below the first and second vessel and which are configured to receive filtered water; a liquid control system in fluid communication with the first vessel, the second vessel, and the underdrain collection system; adsorbent material influent lines in fluid communication with the first and second vessels and which are configured to distribute adsorption materials into the first and second vessels; water wash-down lines in fluid communication with the first and second vessels that are configured to distribute water into the first and second vessels; raw water lines in fluid communication with the first and second vessels that are configured to distribute raw water into the first and second vessels; and adsorbent material effluent lines configured to remove adsorption materials from the first and second vessels, each adsorbent material effluent line comprising an inlet attached to a bottom of the first or second vessel and an outlet that extends out from the first or second vessel and which is positioned above the ring headers of the underdrain collection system.

In some non-limiting embodiments, the first vessel and second vessel each comprise a backwashing space formed between the filtering bed of adsorption materials and a top of the vessels. The backwashing space forms a certain volume of each vessel such as at least 20% of a total internal volume of each vessel.

In certain non-limiting embodiments, the adsorbent material influent lines, the water wash-down lines, the raw water lines, or a combination thereof comprise an inlet end positioned through the sides of the first and second vessel. For example, the adsorbent material influent lines can each comprise an inlet end positioned through the side of the first or second vessel. In such embodiments, each adsorbent material influent line further comprises an inner distribution conduit that extends from the inlet end, into the first or second vessel, and upwards to the top of the first or second vessel such that adsorbent materials are distributed from the top inside area of the first or second vessel.

As previously described, in some non-limiting embodiments, the water wash-down lines each comprise an inlet end positioned through the side of the first or second vessel. In such embodiments, each water wash-down line further comprises an inner water conduit that extends from the inlet end, into the first or second vessel, and upwards to the top of the first or second vessel such that water is distributed from the top inside area of the first or second vessel.

As indicated, in some non-limiting embodiments, the raw water lines each comprise an inlet end positioned through the side of the first or second vessel. In such embodiments, each raw water line further comprises an inner water conduit that extends from the inlet end, into the first or second vessel, and upwards to the top of the first or second vessel such that raw water is distributed from the top inside area of the first or second vessel.

In certain embodiments, the adsorbent material influent lines, the water wash-down lines, the raw water lines, or a combination thereof comprise an inlet end positioned through the tops of the first and second vessel. For example, the raw water lines can each comprise an inlet end positioned through the top of the first or second vessel. In such embodiments, the inlet end of each raw water line can independently comprise a 90 degree elbow that extends over the top of the first or second vessel, a flange that attaches to the top of the first or second vessel, or a combination thereof.

In some non-limiting embodiments, the adsorbent material influent lines and water wash-down lines each comprise an inlet end positioned through the top of the first or second vessel. In such embodiments, the inlet ends of each adsorbent material influent line and water wash-down line can independently comprise a flange that attaches to the top of the first or second vessel.

In certain non-limiting embodiments, the system further comprises air release lines configured to release air from the first and second vessels. In such embodiments, each air release line can comprise an inlet end positioned through a top of the first or second vessel, and an outlet end that extends to the bottom of the first or second vessel. Further, in certain non-limiting embodiments, the water treatment system comprises a total height of 16 feet or less.

The present invention is also directed to a method of treating water comprising: a) distributing raw water through a first raw water line into a first vessel comprising a bed of adsorbent materials; b) filtering the raw water through the bed of adsorbent materials of the first vessel and into an underdrain collection system; c) distributing the filtered water from the underdrain collection system into a second vessel comprising a bed of adsorbent materials by way of a second raw water line; and d) filtering the filtered water through the bed of adsorbent materials of the second vessel and into the underdrain collection system. Further, the water treatment system comprises a total height of 16 feet or less, and wherein the water treatment process of configured to allow for a water flow rate of at least 1,200 gallons per minute with a pressure drop of less than 10 psi.

In certain non-limiting embodiments, the method further comprises backwashing the bed of adsorbent materials of the first and/or second vessel before and/or after filtering raw water, and in which the first and second vessel comprise a backwashing space positioned between the beds of the adsorbent materials and the tops of the first and second vessel.

In some non-limiting embodiments, the method further comprises removing adsorbent materials from the first and/or second vessel through adsorbent material effluent lines, and in which each adsorbent material effluent line comprises an inlet attached to a bottom of the first or second vessel and an outlet that extends out from the first or second vessel and which is positioned above ring headers of the underdrain collection system.

In certain non-limiting embodiments, the method further comprises adding adsorbent materials to the first and/or second vessel through adsorbent material influent lines. Further, in some embodiments, the adsorbent material influent lines, the water wash-down lines, the raw water lines, or a combination thereof comprise an inlet end positioned through the sides of the first and second vessel. In other embodiments, the adsorbent material influent lines, the water wash-down lines, the raw water lines, or a combination thereof comprise an inlet end positioned through the tops of the first and second vessel.

The present invention is further directed to a method of treating water comprising: a) distributing at least a portion of raw water through a first raw water line into a first vessel comprising a bed of adsorbent materials and at least a portion of raw water through a second raw water line into a second vessel comprising a bed of adsorbent materials; and b) filtering the raw water through the bed of adsorbent materials of the first vessel and second vessel and into an underdrain collection system. Further, the water treatment system comprises a total height of 16 feet or less, and wherein the water treatment process of configured to allow for a water flow rate of at least 1,200 gallons per minute with a pressure drop of less than 10 psi.

In certain non-limiting embodiments, the method further comprises backwashing the bed of adsorbent materials of the first and/or second vessel before and/or after filtering raw water, and in which the first and second vessel comprise a backwashing space positioned between the beds of the adsorbent materials and the tops of the first and second vessel.

In some non-limiting embodiments, the method further comprises removing adsorbent materials from the first and/ or second vessel through adsorbent material effluent lines, and in which each adsorbent material effluent line comprises an inlet attached to a bottom of the first or second vessel and an outlet that extends out from the first or second vessel and which is positioned above ring headers of the underdrain collection system.

In certain non-limiting embodiments, the method further comprises adding adsorbent materials to the first and/or second vessel through adsorbent material influent lines. Further, in some embodiments, the adsorbent material influent lines, the water wash-down lines, the raw water lines, or a combination thereof comprise an inlet end positioned through the sides of the first and second vessel. In other embodiments, the adsorbent material influent lines, the water wash-down lines, the raw water lines, or a combination thereof comprise an inlet end positioned through the tops of the first and second vessel.

The present invention is also directed to the following clauses.

Clause 1: A water treatment system comprising: a first vessel comprising adsorbent materials that form a filtering bed in an interior of the first vessel; a second vessel in fluid communication with the first vessel and which comprises adsorbent materials that form a filtering bed in an interior of the second vessel; an underdrain collection system comprising ring headers formed below the first and second vessel and which are configured to receive filtered water; a liquid control system in fluid communication with the first vessel, the second vessel, and the underdrain collection system; adsorbent material influent lines in fluid communication with the first and second vessels and which are configured to distribute adsorption materials into the first and second vessels; water wash-down lines in fluid communication with the first and second vessels that are configured to distribute water into the first and second vessels; raw water lines in fluid communication with the first and second vessels that are configured to distribute raw water into the first and second vessels; and adsorbent material effluent lines configured to remove adsorption materials from the first and second vessels, each adsorbent material effluent line comprising an inlet attached to a bottom of the first or second vessel and an outlet that extends out from the first or second vessel and which is positioned above the ring headers of the underdrain collection system.

Clause 2: The water treatment system of clause 1, wherein the first vessel and the second vessel each comprise a backwashing space formed between the filtering bed of adsorption materials and a top of the vessels.

Clause 3: The water treatment system of clause 2, wherein the backwashing space comprises at least 20% of a total internal volume of each vessel.

Clause 4: The water treatment system of any of clauses 1 to 3, wherein the adsorbent material influent lines, the water wash-down lines, the raw water lines, or a combination thereof comprise an inlet end positioned through the sides of the first and second vessel.

Clause 5: The water treatment system of clause 4, wherein the adsorbent material influent lines each comprise an inlet end positioned through the side of the first or second vessel, and wherein each adsorbent material influent line further comprises an inner distribution conduit that extends from the inlet end, into the first or second vessel, and upwards to the top of the first or second vessel such that adsorbent materials are distributed from the top inside area of the first or second vessel.

Clause 6: The water treatment system of any of clauses 4 to 5, wherein the water wash-down lines each comprise an inlet end positioned through the side of the first or second vessel, and wherein each water wash-down line further comprises an inner water conduit that extends from the inlet end, into the first or second vessel, and upwards to the top of the first or second vessel such that water is distributed from the top inside area of the first or second vessel.

Clause 7: The water treatment system of any of clauses 4 to 6, wherein the raw water lines each comprise an inlet end positioned through the side of the first or second vessel, and wherein each raw water line further comprises an inner water conduit that extends from the inlet end, into the first or second vessel, and upwards to the top of the first or second vessel such that raw water is distributed from the top inside area of the first or second vessel.

Clause 8: The water treatment system of any of clauses 1 to 7, wherein the adsorbent material influent lines, the water wash-down lines, the raw water lines, or a combination thereof comprise an inlet end positioned through the tops of the first and second vessel.

Clause 9: The water treatment system of clause 8, wherein the raw water lines each comprise an inlet end positioned through the top of the first or second vessel, and wherein the inlet end of each raw water line independently comprises a 90 degree elbow that extends over the top of the first or second vessel.

Clause 10: The water treatment system of any of clauses 8 to 9, wherein the raw water lines each comprise an inlet end positioned through the top of the first or second vessel, and wherein the inlet end of each raw water line independently comprises a flange that attaches to the top of the first or second vessel.

Clause 11: The water treatment system of any of clauses 8 to 10, wherein the adsorbent material influent lines and water wash-down lines each comprise an inlet end positioned through the top of the first or second vessel, and wherein the inlet ends of each adsorbent material influent line and water wash-down line independently comprise a flange that attaches to the top of the first or second vessel.

Clause 12: The water treatment system of any of clauses 1 to 11, further comprising air release lines configured to release air from the first and second vessels.

Clause 13: The water treatment system of clause 12, wherein each air release line comprises an inlet end positioned through a top of the first or second vessel, and an outlet end that extends to the bottom of the first or second vessel.

Clause 14: The water treatment system of any of clauses 1 to 13, wherein the water treatment system comprises a total height of 16 feet or less.

Clause 15: A method of treating water comprising: a) distributing raw water through a first raw water line into a first vessel comprising a bed of adsorbent materials; b) filtering the raw water through the bed of adsorbent materials of the first vessel and into an underdrain collection system; c) distributing the filtered water from the underdrain collection system into a second vessel comprising a bed of adsorbent materials by way of a second raw water line; and d) filtering the filtered water through the bed of adsorbent materials of the second vessel and into the underdrain collection system, wherein the water treatment system comprises a total height of 16 feet or less, and wherein the water treatment process of configured to allow for a water flow rate of at least 1,200 gallons per minute with a pressure drop of less than 10 psi.

Clause 16: The method of clause 15, further comprising backwashing the bed of adsorbent materials of the first and/or second vessel before and/or after filtering raw water, and wherein the first and second vessel comprise a backwashing space positioned between the beds of the adsorbent materials and the tops of the first and second vessel.

Clause 17: The method of any of clauses 15 to 16, further comprising removing adsorbent materials from the first and/or second vessel through adsorbent material effluent lines, wherein each adsorbent material effluent line comprises an inlet attached to a bottom of the first or second vessel and an outlet that extends out from the first or second vessel and which is positioned above ring headers of the underdrain collection system.

Clause 18: The method of any of clauses 15 to 17, further comprising adding adsorbent materials to the first and/or second vessel through adsorbent material influent lines.

Clause 19: The method of any of clauses 15 to 18, wherein the adsorbent material influent lines, the water wash-down lines, the raw water lines, or a combination thereof comprise an inlet end positioned through the sides of the first and second vessel.

Clause 20: The method of any of clauses 15 to 19, wherein the adsorbent material influent lines, the water wash-down lines, the raw water lines, or a combination thereof comprise an inlet end positioned through the tops of the first and second vessel.

Clause 21: A method of treating water comprising: a) distributing at least a portion of raw water through a first raw water line into a first vessel comprising a bed of adsorbent materials and at least a portion of raw water through a second raw water line into a second vessel comprising a bed of adsorbent materials; and b) filtering the raw water through the bed of adsorbent materials of the first vessel and second vessel and into an underdrain collection system, wherein the water treatment system comprises a total height of 16 feet or less, and wherein the water treatment process of configured to allow for a water flow rate of at least 1,200 gallons per minute with a pressure drop of less than 10 psi.

Clause 22: The method of clause 21, further comprising backwashing the bed of adsorbent materials of the first and/or second vessel before and/or after filtering raw water, and wherein the first and second vessel comprise a backwashing space positioned between the beds of the adsorbent materials and the tops of the first and second vessel.

Clause 23: The method of any of clauses 21 to 22, further comprising removing adsorbent materials from the first and/or second vessel through adsorbent material effluent lines, wherein each adsorbent material effluent line comprises an inlet attached to a bottom of the first or second vessel and an outlet that extends out from the first or second vessel and which is positioned above ring headers of the underdrain collection system.

Clause 24: The method of any of clauses 21 to 23, further comprising adding adsorbent materials to the first and/or second vessel through adsorbent material influent lines.

Clause 25: The method of any of clauses 21 to 24, wherein the adsorbent material influent lines, the water wash-down lines, the raw water lines, or a combination thereof comprise an inlet end positioned through the sides of the first and second vessel.

Clause 26: The method of any of clauses 21 to 25, wherein the adsorbent material influent lines, the water wash-down lines, the raw water lines, or a combination thereof comprise an inlet end positioned through the tops of the first and second vessel.

DETAILED DESCRIPTION OF THE INVENTION

Figure 1:
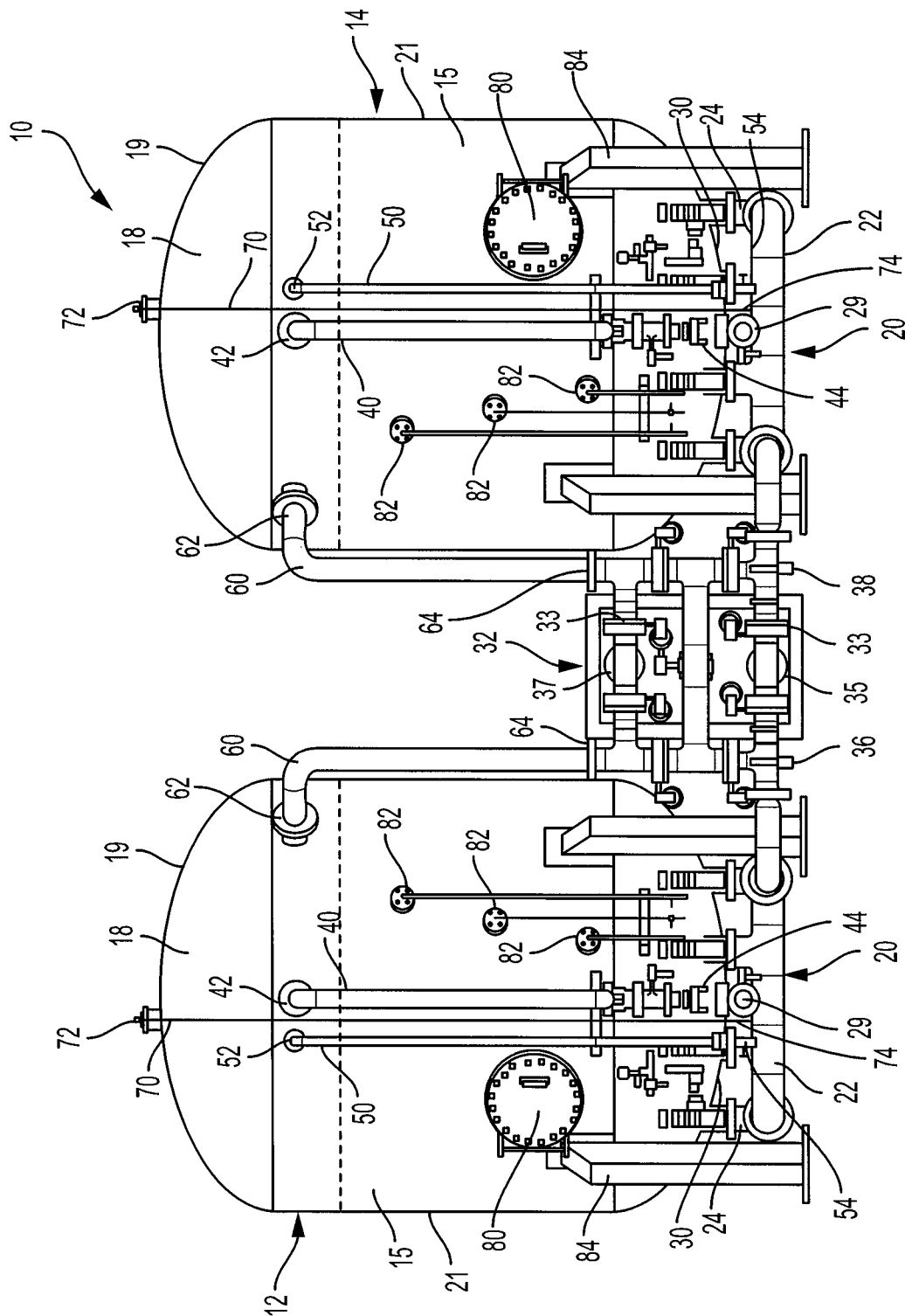
FIG. 1 illustrates a perspective view of a water treatment system of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 2:
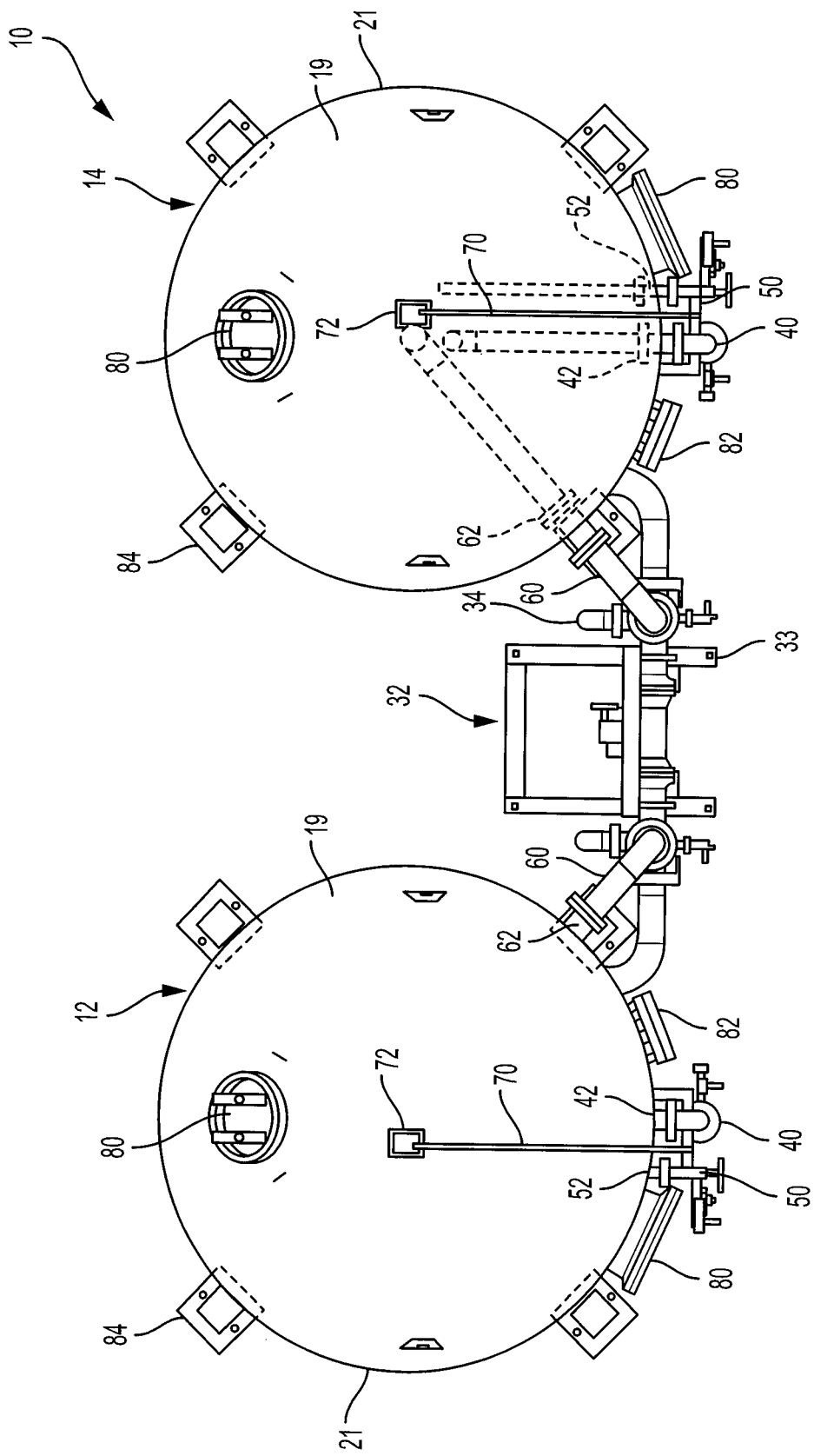
FIG. 2 illustrates a top view of the water treatment system of FIG. 1.

Referring to FIGS. 1 and 2, the present invention includes a water treatment system 10 comprising a first vessel 12 and a second vessel 14. Each vessel 12, 14 can independently be made of various materials including, but not limited to, various types of metals. For example, each vessel 12, 14 can be made of carbon steel. In addition, each vessel 12, 14 is independently sized to meet the desired filtering requirements for a particular system 10 and area. As will be explained in further detail herein, each vessel 12, 14 is designed such that the water treatment system 10 has a height of 16 feet or less, or 14 feet or less, or 12 feet or less, or 10 feet or less, while also meeting the desired filtering requirements. To obtain the previously described heights, it is appreciated that each vessel 12, 14 can comprise a height of 15 feet or less, or 14.5 feet or less, or 14 feet or less, or 13.5 feet or less, or 13 feet or less, or 12.5 feet or less, or 12 feet or less, while also meeting the desired filtering requirements.

As indicated, the first and second vessels 12, 14 of the water treatment system 10 are both configured to filter water, such as raw water containing undesirable constituents, using adsorption materials that form a filtering bed 15 in an interior of each vessel 12, 14. Non-limiting examples of adsorption materials include granular activated carbon media such as virgin coconut or bituminous coal based granular activated carbon, ion-exchange resins, sand, and any combination thereof. It is appreciated that each vessel 12, 14 can comprise the same type of adsorption materials or different types of adsorption materials. The type(s) of adsorption materials are selected based on the constituents that are to be filtered from the water. The bed 15 of adsorption materials can fill each vessel 12, 14 at an amount sufficient to filter the water. For instance, each vessel 12, 14 can independently comprise a filtering bed 15 of adsorption materials that makes up at least 50%, at least 60%, at least 65%, or at least 75% of the total internal volume of each vessel 12, 14.

Referring to FIG. 1, a backwashing space 18 is formed between the bed 15 of adsorption materials and the top 19 of each vessel 12, 14 to allow the bed 15 of adsorption materials to be cleaned. As used herein, "backwashing" refers to the process of distributing water and, optionally, gas such as air upwards into the bed 15 of adsorption materials to remove unwanted materials trapped in the bed 15 such as from the filtering process and/or to classify the adsorption materials. It is appreciated that the backwashing process causes the unwanted materials to move upwards out of the bed 15 of adsorption materials and/or to move/adjust the placement of the adsorption materials prior to a filtering process. As such, the backwashing space 18 is configured to have a volume that allows for sufficient cleaning and movement of the bed 15 of adsorption materials. For example, each vessel 12, 14 can independently comprise a backwashing space 18 that makes up at least 10%, at least 15%, at least 20%, or at least 25% of the total internal volume of each vessel 12, 14.

Figure 3:
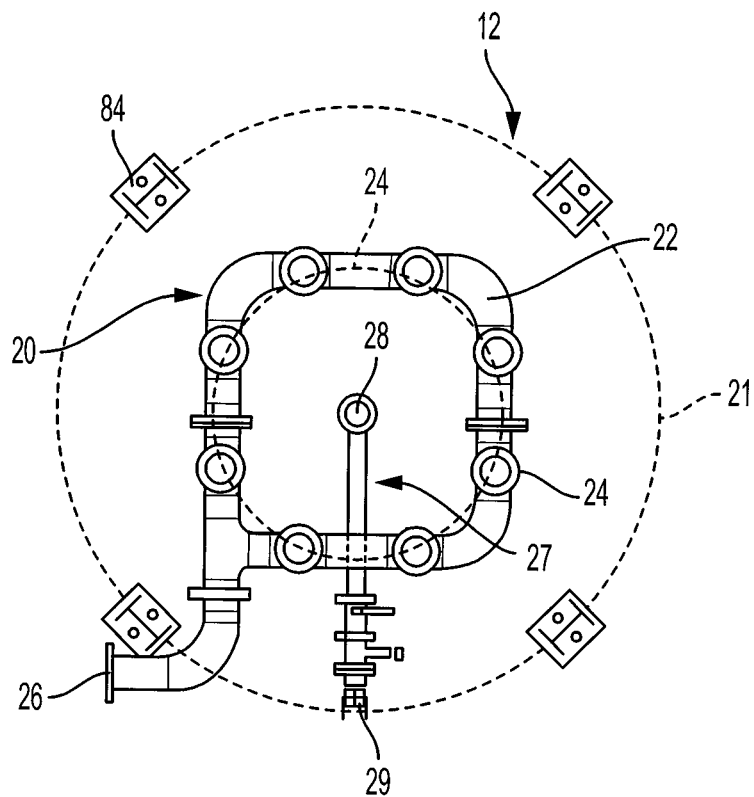
FIG. 3 illustrates a bottom view of a vessel of the water treatment system of FIG. 1.
Figure 4:
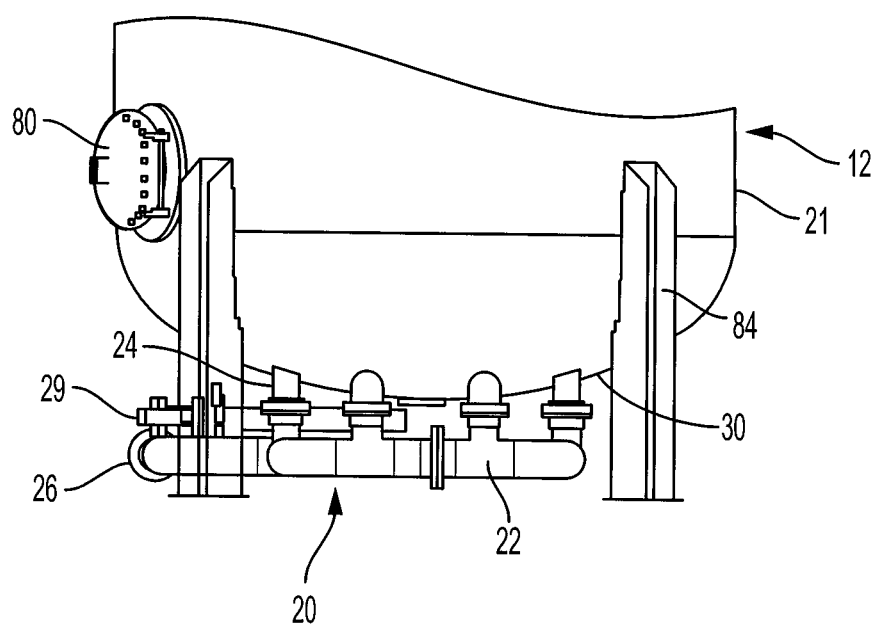
FIG. 4 illustrates a partial side view of a vessel of the water treatment system of FIG. 1.

The water treatment system 10 also comprises an underdrain collection system 20 that collects filtered water and distributes backwash water into the bed 15 of adsorption materials. Referring to FIGS. 1, 3, and 4, the underdrain collection system 20 includes ring headers 22 formed from interconnected pipes and which are positioned below each vessel 12, 14. The ring headers 22 are in fluid communication with the vessels 12, 14 through a plurality of collection ports 24 formed through the bottoms 30 of the vessels 12, 14. Each ring header 22 includes an outlet 26 that discharges the filtered water and, optionally, internal filter screens to filter out materials that enter the underdrain collection system 20.

Referring to FIGS. 1, 3, and 4, each vessel 12, 14 also includes an adsorbent material effluent line 27 that is controlled to remove adsorbent materials from the vessels 12, 14. Each adsorbent material effluent line 27 comprises an inlet 28 connected to the bottom 30 of the vessels 12, 14, and an outlet 29 that extends out from the vessels 12, 14. In accordance with the present invention, the outlet 29 of each adsorbent material effluent line 27 is positioned above the ring headers 22 of the underdrain collection system 20. For example, the outlet 29 can comprise a pad flange to elevate the outlet 29 above of the ring headers 22. By elevating the outlet 29 of the adsorbent material effluent lines 27 above of the ring headers 22, the overall height of each vessel 12, 14 is lowered.

Figure 5:
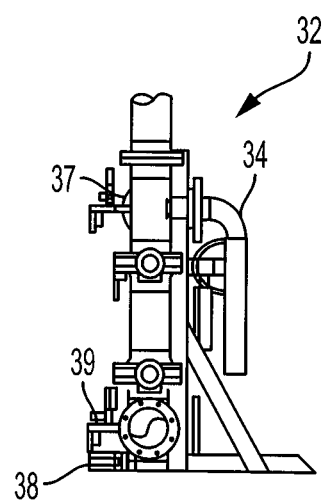
FIG. 5 illustrates a liquid control system of the water treatment system of FIG. 1.

As shown in FIGS. 1 and 2, each vessel 12, 14 is fluidly connected to a liquid control system 32 that is configured to control at least raw water entering at least one of the vessels 12, 14, filtered water exiting the vessels 12, 14, backwashing water distributed upwards into the adsorption materials of the vessels 12, 14, and the distribution of filtered water from the underdrain collection system 20 of one vessel 12 or 14 into the other vessel 12 or 14. The liquid control system 32 can comprise various components to control distribution of raw and filtered water through each vessel 12, 14 as well as backwashing liquids. For example, and as shown in FIGS. 1 and 5, the liquid control system 32 can comprise control valves 33 for controlling distribution of the fluids, pressure relief devices 34 to relieve water pressure, inlet port(s) 37 for receiving water that needs filtered, and discharge port(s) 35 for collecting filtered water, contaminants and backwashing liquids. As shown in FIG. 1, the liquid control system 32 can also be designed to have the discharge port 35, such as a flanged outlet, that controls effluent materials and which is separated into a different area from the inlet port 37, such as a flanged inlet, that controls influent materials in order to efficiently control the effluent and influent materials separately.

Referring to FIG. 1, the liquid control system 32 is positioned between the first vessel 12 and the second vessel 14 to distribute and control the flow of liquids between the two vessels 12, 14. It is appreciated that the distance between the first vessel 12 and the second vessel 14 is selected to provide proper flow of fluids through the liquid control system 32 and between the two vessels 12, 14.

The water treatment system 10 further comprises a piping network that establishes communication between the vessels 12, 14, the liquid control system 32, and sources of raw water, fresh/clean water, and adsorbent materials. For instance, and as shown in FIG. 1, each vessel 12, 14 comprises an adsorbent material influent line 40 for distributing adsorbent materials such as carbon into the vessels 12, 14, a water wash-down line 50 for distributing fresh/clean water into the vessels 12, 14, a raw water line 60 for distributing raw water to be filtered into the vessels 12, 14, and an air release line 70 for releasing air from the vessels 12, 14. The adsorbent material influent line 40, water wash-down line 50, raw water line 60, and air release line 70 each independently extend along at least a portion of the height of the vessels 12, 14. Further, each previously described line can be formed from various materials including, but not limited to, carbon steel piping.

Figure 6:
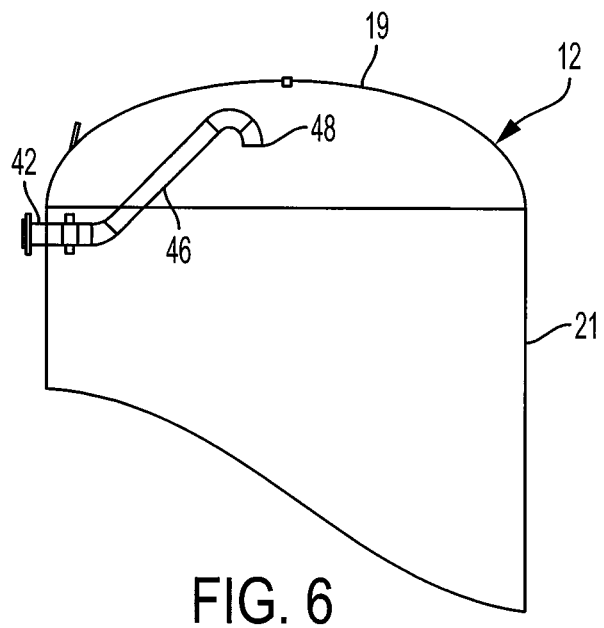
FIG. 6 illustrates a partial cross-sectional side view of a vessel of the water treatment system of FIG. 1 having an inner distribution conduit attached to an adsorbent material influent line.

As previously described, the vessels 12, 14 each include an adsorbent material influent line 40 that independently extend along at least a portion of the height of the vessels 12, 14. In some examples, referring to FIG. 1, the adsorbent material influent lines 40 include an inlet end 42 positioned through the sides 21 of the vessels 12, 14, and an outlet end 44 positioned towards the bottom 30 of the vessels 12, 14. To properly distribute adsorbent materials, an inner distribution conduit 46 extends from the inlet end 42, into the vessels 12, 14, and upwards to the top 19 of the vessels such that the adsorbent materials are distributed from the top 19 inside area of the vessels 12, 14. For example, and as shown in FIG. 6, the inner distribution conduit 46 can extend into the vessels 12, 14 at angle upwards toward the top 19 of each vessel 12, 14 where the distribution outlet 48 of the inner distribution conduit 46 is directed downwards, such as with an elbow, to allow the adsorbent materials to be evenly distributed into the vessels 12, 14.

Figure 7:
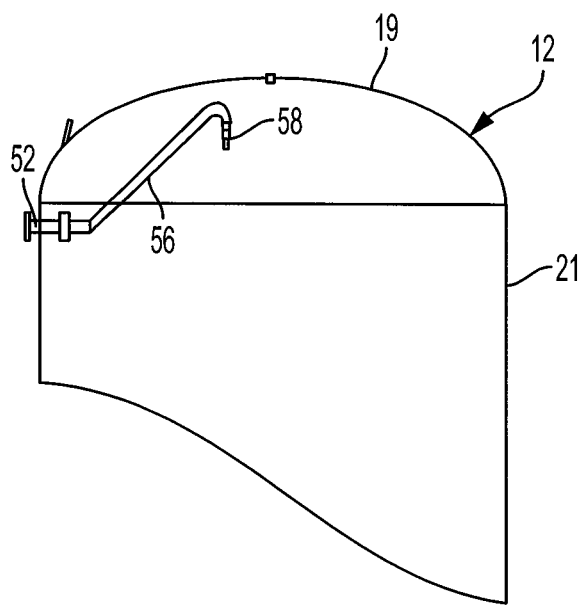
FIG. 7 illustrates a partial cross-sectional side view of a vessel of the water treatment system of FIG. 1 having an inner water conduit attached to a water wash-down line.

Referring to FIG. 1, each water wash-down line 50 can similarly include an inlet end 52 positioned through the sides 21 of the vessels 12, 14, and an outlet end 54 positioned towards the bottom 30 of each vessel 12, 14. To distribute water into the vessels 12, 14, an inner water conduit 56 extends from the inlet end 52, into the vessels 12, 14, and upwards to the top 19 of the vessels 12, 14 such that the water is distributed from the top 19 inside area of the vessels 12, 14. For example, and as shown in FIG. 7, the inner water conduit 56 can extend into the vessels 12, 14 at an angle upwards toward the top 19 of each vessel 12, 14 where the water distribution outlet 58 of the inner water conduit 56 is directed downwards, such as with an elbow, to allow water to be evenly distributed into the vessels 12, 14 and over the adsorbent materials.

Figure 8:
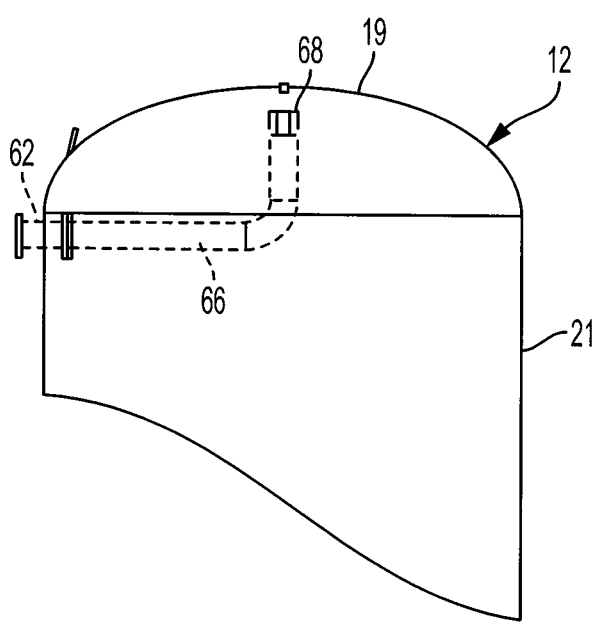
FIG. 8 illustrates a partial cross-sectional side view of a vessel of the water treatment system of FIG. 1 having an inner water conduit attached to a raw water line.

Each raw water line 60 can additionally include an inlet end 62 positioned through the sides 21 of the vessels 12, 14, and an outlet end 64 connected to the liquid control system 32 where raw water is distributed into the raw water line 60 for filtering or where previously filtered water is distributed for further filtering/polishing. To distribute raw water into the vessels 12, 14, an inner water conduit 66 extends from the inlet end 62, into the vessels 12, 14, and upwards to the top 19 of the vessels 12, 14 such that the raw water is distributed from the top 19 inside area of the vessels 12, 14. For example, and as shown in FIG. 8, the inner water conduit 66 can extend out into the vessels 12, 14 and then upwards toward the top 19 of each vessel 12, 14 where a water diffuser 68 distributes raw water into the vessels 12, 14 and over the adsorbent materials.

It was found that by attaching the inlet ends 42, 52, 62 of the adsorbent material influent line 40, water wash-down line 50, and raw water line 60 into the sides 21 of the vessels 12, 14, the overall height of the vessels 12, 14 can be lowered. While the overall height is lowered, the function and control of the water treatment system 10 is not affected, thereby meeting the technical requirements of the water treatment process.

In some examples, and as shown in FIGS. 9-13, the inlet ends 42, 52, 62 of the adsorbent material influent line 40, water wash-down line 50, and raw water line 60 are connected to and positioned through the top 19 of the vessels 12, 14. In such examples, the inlet end 62 of each raw water line 60 can independently comprise: a 90 degree elbow that extends over a portion of the top 19 of the vessels 12, 14; a flange 63, such as a slip based flange for example, that attaches the inlet end 62 to the top 19 of the vessels 12, 14; or both a 90 degree elbow and a flange 63. It was found that the use of a 90 degree elbow, such as a short-radius elbow for example, and/or a flange 63, such as a slip-on flange for example, can lower the overall height of the water treatment system 10 without adversely affecting the desired filtering and backwashing processes.

Figure 9:
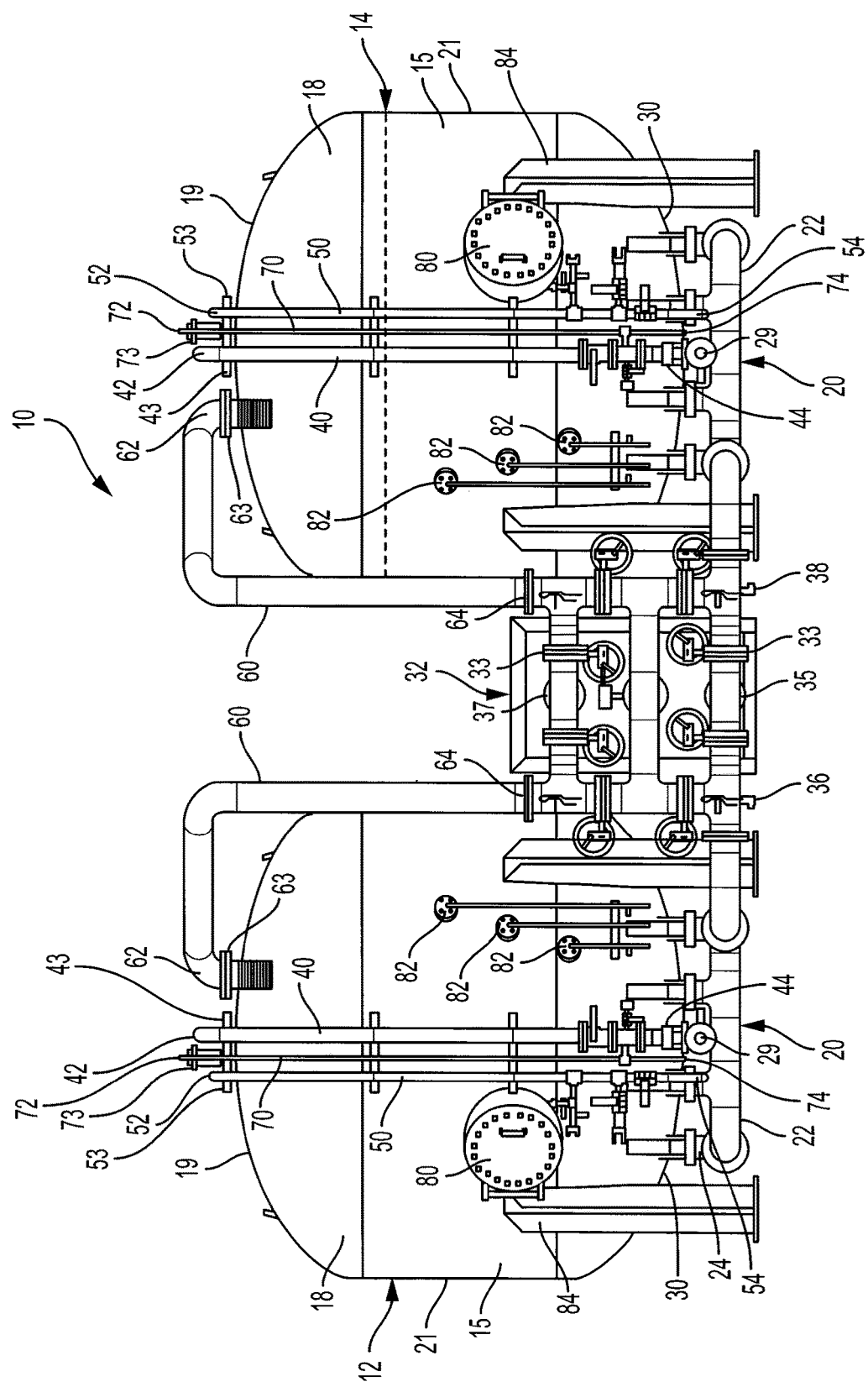
FIG. 9 illustrates a perspective view of a second water treatment system of the present invention.
Figure 10:
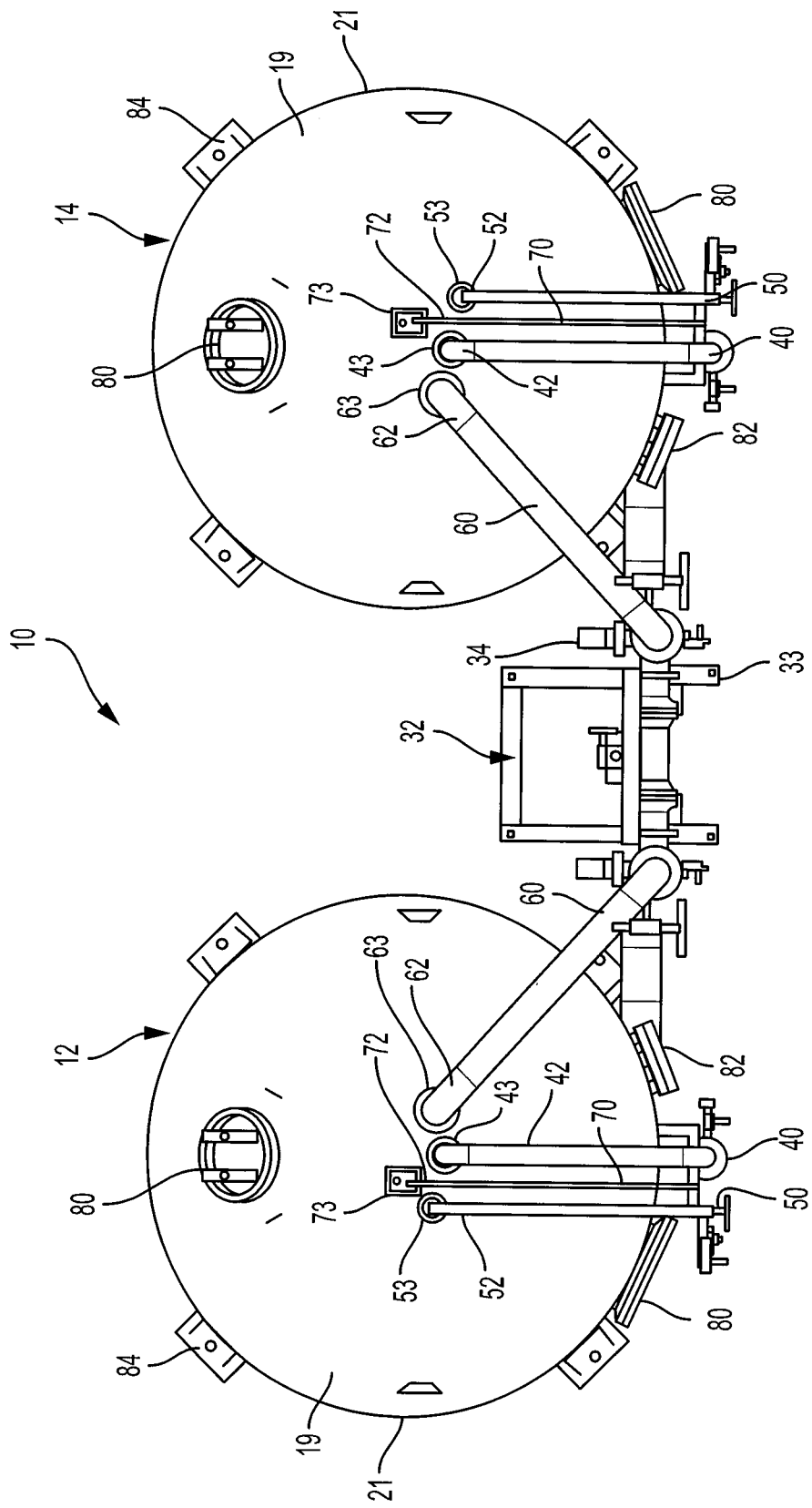
FIG. 10 illustrates a top view of the water treatment system of FIG. 9.
Figure 11:
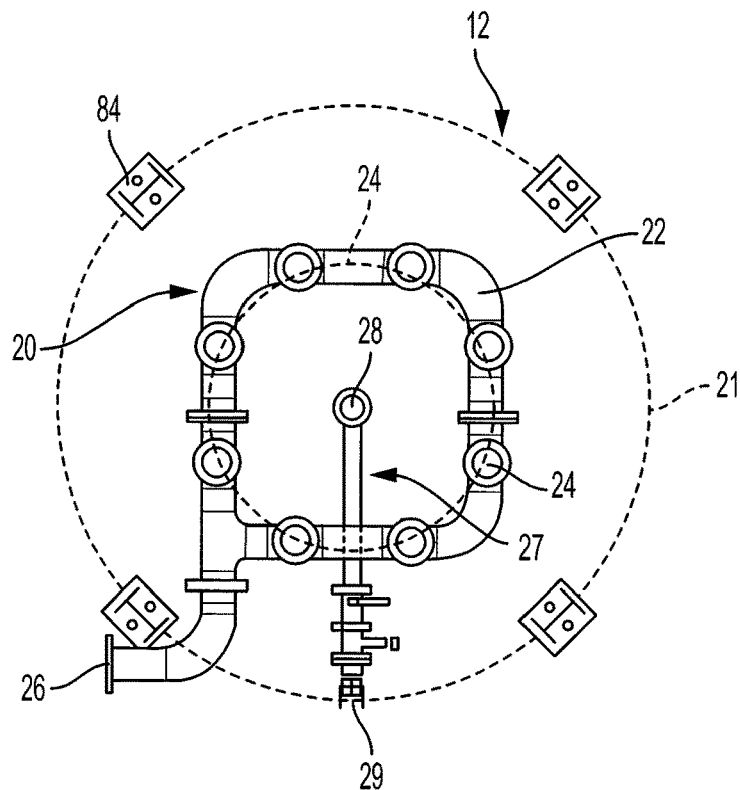
FIG. 11 illustrates a bottom view of a vessel of the water treatment system of FIG. 9.
Figure 12:
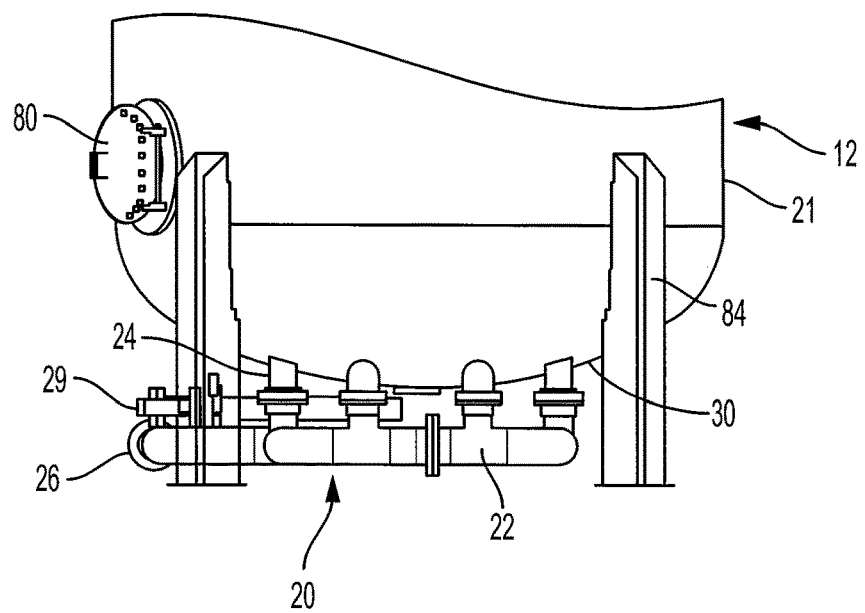
FIG. 12 illustrates a partial side view of a vessel of the water treatment system of FIG. 9.
Figure 13:
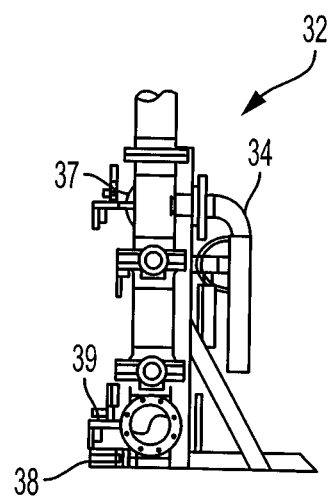
FIG. 13 illustrates a liquid control system of the water treatment system of FIG. 9.

Referring to FIG. 9, the inlet ends 42, 52 of each adsorbent material influent line 40 and water wash-down line 50 can also include a connection flange 43, 53 that can also help lower the overall height of the water treatment system 10. For example, the inlet ends 42, 52 of the adsorbent material influent line 40 and water wash-down line 50 can each include a pad flange that can reduce the overall height of the water treatment system 10 without adversely affecting the desired function.

As indicated, the vessels 12, 14 further comprise an air release line 70. As shown in FIGS. 1 and 9, each air release line 70 comprises an inlet end 72 positioned through the top 19 of the vessels 12, 14, and an outlet end 74 positioned towards the bottom 30 of the vessels 12, 14. The inlet end 72 can comprise a connection device 73 that can reduce the overall height of the water treatment system 10. For instance, the inlet end 72 can comprise a coupler that can reduce the overall height of the water treatment system 10.

It is appreciated that the water treatment system 10 can comprise various other components. For example, the water treatment system 10 can comprise manways 80 formed through the sides 21 of each vessel 12, 14 that allow access to the inside of the vessels 12, 14. In addition, each vessel 12, 14 can also include sample taps 82 positioned at different height levels along the sides 21 of the vessels 12, 14. The sample taps 82 allow access to water samples during filtering, washing, and backwashing processes at different height levels in the vessels 12, 14 to determine, among other things, the filtering ability of the adsorbent materials. Further, each vessel 12, 14 can be secured in place with support legs 84 that extend from the sides 21 of the vessels 12, 14 to the ground. Other non-limiting additional components include pressure gauges and flow meters.

The previously described water treatment system 10 can be operated in series or in parallel. During operation of the water treatment system 10 in series, raw water enters an inlet port 37 of the liquid control system 32 where it is distributed through the raw water line 60 and into the first vessel 12 or second vessel 14. The raw water then flows through the bed 15 of adsorbent materials to filter unwanted constituents from the water. The filtered water exits the first vessel 12 or second vessel 14 into the underdrain collection system 20 by way of the plurality of collection ports 24 formed through the bottom 30 of the vessel 12 or 14. The filtered water then flows from the underdrain collection system 20 into the opposite vessel 12 or 14 by use of the opposite raw water line 60. The water is further filtered/polished through the bed 15 of adsorbent materials of the opposite vessel 12 or 14 before entering the underdrain collection system 20. The filtered effluent water can then be collected from a sample port 39.

Alternatively, when the water treatment system 10 is operated in parallel, raw water enters an inlet port 37 of the liquid control system 32 where it is separated and distributed through different raw water lines 60 and into the first vessel 12 and second vessel 14. The raw water then flows through the bed 15 of adsorbent materials in each of the vessels 12, 14 to filter unwanted constituents from the water. The filtered water exits the first vessel 12 or second vessel 14 into the underdrain collection system 20 by way of the plurality of collection ports 24 formed through the bottom 30 of the vessel 12 or 14. The filtered effluent water can then be collected from a sample port 39.

After any of the previously described filtering processes, the filtering bed 15 of adsorption materials can be backwashed by introducing water into the bottom of the bed 15 and distributing the water upwards to the top 19 of the vessels 12, 14. The backwashing process causes the adsorption materials to expand and release constituents filtered out from the raw water. The backwash water can flow from the top 19 of the vessel and into the raw water lines 60. The water used for backwashing can then exit through the discharge flange positioned between the flanges associated with 37 and 35 (see FIG. 1).

As previously described, the water treatment system 10 also includes adsorbent material effluent lines 27 and adsorbent material influent lines 40. As such, before and/or after a filtering and/or backwashing process, the adsorption materials can be replaced by removing the existing adsorption materials in the vessels 12, 14 through the adsorbent material effluent lines 27 and adding new adsorption materials through the adsorbent material influent lines 40. Water from the water wash-down line 50 can be used to help remove the existing adsorbent materials. After adding new adsorption materials to the vessels 12, 14, a backwashing process can be applied to classify and adjust the positioning of the new adsorbent materials.

It was found that the water treatment system 10 of the present invention provides a limited number of vessels 12, 14 which meet height restrictions, flow requirements, desired media volumes, and lowered pressure drops. For instance, the water treatment system 10 can comprise a total height of 16 feet or less, or 14 feet or less, or 12 feet or less, or 10 feet or less, and which also allows for a water flow rate of at least 1,200 gallons per minute with a pressure drop of less than 10 psi. In addition, the vessels 12, 14 of the water treatment system 10 allow for a sufficient amount of backwashing space 18 as previously described while also allowing for a large of amount of adsorption materials such as at least 15,000 lbs. of adsorption materials, or at least 20,000 lbs. of adsorption materials, or at least 30,000 lbs. of adsorption materials, or at least 40,000 lbs. of adsorption materials.

Whereas particular embodiments of this invention have been described above for purposes of illustration, it will be evident to those skilled in the art that numerous variations of the details of the present invention may be made without departing from the invention as defined in the appended claims.

The invention claimed is:

1. A water treatment system comprising:
   a first vessel comprising adsorbent materials that form a filtering bed in an interior of the first vessel;
   a second vessel in fluid communication with the first vessel and which comprises adsorbent materials that form a filtering bed in an interior of the second vessel;
   an underdrain collection system comprising ring headers formed below the first and second vessel and which are configured to receive filtered water;
   a liquid control system in fluid communication with the first vessel, the second vessel, and the underdrain collection system and which distributes and controls the flow of liquids between both the first and second vessel;
   adsorbent material influent lines in fluid communication with the first and second vessels and which are configured to distribute adsorption materials into the first and second vessels;

water wash-down lines in fluid communication with the first and second vessels that are configured to distribute water into the first and second vessels;

raw water lines in fluid communication with the first and second vessels that are configured to distribute raw water into the filtering beds of adsorbent materials of the first and second vessels to filter unwanted constituents with the adsorbent materials, the raw water lines of the first and second vessels each independently comprise an inlet end positioned through the first or second vessel and an outlet end connected to an inlet port of the liquid control system; and adsorbent material effluent lines configured to remove adsorption materials from the first and second vessels, each adsorbent material effluent line comprising an inlet attached to a bottom of the first or second vessel and an outlet that extends out from the first or second vessel and which is positioned above the ring headers of the underdrain collection system, wherein the first and second vessels comprise separate ring headers that each independently comprise interconnected pipes, a plurality of collection ports extending from the interconnected pipes and formed through a bottom of the vessels, and an outlet that is connected to an outlet port of the liquid control system.

2. The water treatment system of claim 1, wherein the first vessel and the second vessel each comprise a backwashing space formed between the filtering bed of adsorption materials and a top of the vessels.

3. The water treatment system of claim 2, wherein the backwashing space comprises at least 20% of a total internal volume of each vessel.

4. The water treatment system of claim 1, wherein the adsorbent material influent lines, the water wash-down lines, the raw water lines, or a combination thereof comprise an inlet end positioned through the sides of the first and second vessel.

5. The water treatment system of claim 4, wherein the adsorbent material influent lines each comprise an inlet end positioned through the side of the first or second vessel, and wherein each adsorbent material influent line further comprises an inner distribution conduit that extends from the inlet end, into the first or second vessel, and upwards to a top of the first or second vessel such that adsorbent materials are distributed from the top inside area of the first or second vessel.

6. The water treatment system of claim 4, wherein the water wash-down lines each comprise an inlet end positioned through the side of the first or second vessel, and wherein each water wash-down line further comprises an inner water conduit that extends from the inlet end, into the first or second vessel, and upwards to a top of the first or second vessel such that water is distributed from the top inside area of the first or second vessel.

7. The water treatment system of claim 4, wherein the raw water lines each comprise an inlet end positioned through the side of the first or second vessel, and wherein each raw water line further comprises an inner water conduit that extends from the inlet end, into the first or second vessel, and upwards to a top of the first or second vessel such that raw water is distributed from the top inside area of the first or second vessel.

8. The water treatment system of claim 1, wherein the adsorbent material influent lines, the water wash-down lines, the raw water lines, or a combination thereof comprise an inlet end positioned through a top of the first and second vessel.

9. The water treatment system of claim 8, wherein the raw water lines each comprise an inlet end positioned through the top of the first or second vessel, and wherein the inlet end of each raw water line independently comprises a 90 degree elbow that extends over the top of the first or second vessel.

10. The water treatment system of claim 8, wherein the raw water lines each comprise an inlet end positioned through the top of the first or second vessel, and wherein the inlet end of each raw water line independently comprises a flange that attaches to the top of the first or second vessel.

11. The water treatment system of claim 8, wherein the adsorbent material influent lines and water wash-down lines each comprise an inlet end positioned through the top of the first or second vessel, and wherein the inlet ends of each adsorbent material influent line and water wash-down line independently comprise a flange that attaches to the top of the first or second vessel.

12. The water treatment system of claim 1, further comprising air release lines configured to release air from the first and second vessels.

13. The water treatment system of claim 12, wherein each air release line comprises an inlet end positioned through a top of the first or second vessel, and an outlet end that extends to the bottom of the first or second vessel.

14. The water treatment system of claim 1, wherein the water treatment system comprises a total height of 16 feet or less.

* * * * *